United States Patent
Gisin

(10) Patent No.: US 11,820,581 B2
(45) Date of Patent: Nov. 21, 2023

(54) POWDER DISPENSER

(71) Applicant: Yevgeniy Gisin, San Leandro, CA (US)

(72) Inventor: Yevgeniy Gisin, San Leandro, CA (US)

(*) Notice: Subject to any disclaimer, the term of this patent is extended or adjusted under 35 U.S.C. 154(b) by 0 days.

(21) Appl. No.: 17/974,441

(22) Filed: Oct. 26, 2022

(65) Prior Publication Data

US 2023/0130943 A1    Apr. 27, 2023

Related U.S. Application Data

(60) Provisional application No. 63/272,188, filed on Oct. 27, 2021.

(51) Int. Cl.
  *B65D 83/06*    (2006.01)
  *A47J 47/01*    (2006.01)

(52) U.S. Cl.
  CPC ............. *B65D 83/06* (2013.01); *A47J 47/01* (2013.01)

(58) Field of Classification Search
  CPC ........... B65D 83/06; A47J 47/01; A47G 19/34
  See application file for complete search history.

(56) References Cited

U.S. PATENT DOCUMENTS

| | | | | |
|---|---|---|---|---|
| 5,427,089 A | * | 6/1995 | Kraemer | A61M 15/0016 128/203.29 |
| 8,783,519 B2 | * | 7/2014 | Fontaine | B65D 51/249 222/173 |
| 2008/0302828 A1 | * | 12/2008 | Pozzi | B65D 47/2056 222/189.09 |
| 2023/0130943 A1 | * | 4/2023 | Gisin | B65D 83/06 222/480 |

FOREIGN PATENT DOCUMENTS

| | | | | |
|---|---|---|---|---|
| DE | 19713720 A1 | * | 1/1999 | ......... B05B 11/3001 |
| DE | 202008017185 U1 | * | 6/2010 | ................ A61J 1/05 |
| EP | 1927373 B1 | * | 8/2012 | ........ A61M 15/0015 |
| FR | 1223142 A | * | 6/1960 | |
| WO | WO 2004009168 A1 | * | 1/2004 | |

* cited by examiner

*Primary Examiner* — Bob Zadeh
(74) *Attorney, Agent, or Firm* — CHHABRA LAW FIRM, PC

(57) ABSTRACT

Using various embodiments an arrangement of a novel device that employs the interaction of a selectively permeable flexible membrane, a penetrating orifice and an integrated straw to enable convenient dispensing of powdered substances. In one embodiment, the device comprises a reservoir, a permeable slit flexible membrane, a spring-biased dispensing orifice, a moving assembly configured to cause penetration of a portion of the spring-biased dispensing orifice into the permeable slit flexible membrane when a force is applied on the moving assembly, and a spring, coupled to the moving assembly, configured to rebound the moving assembly into a resting position when the force is released.

20 Claims, 5 Drawing Sheets

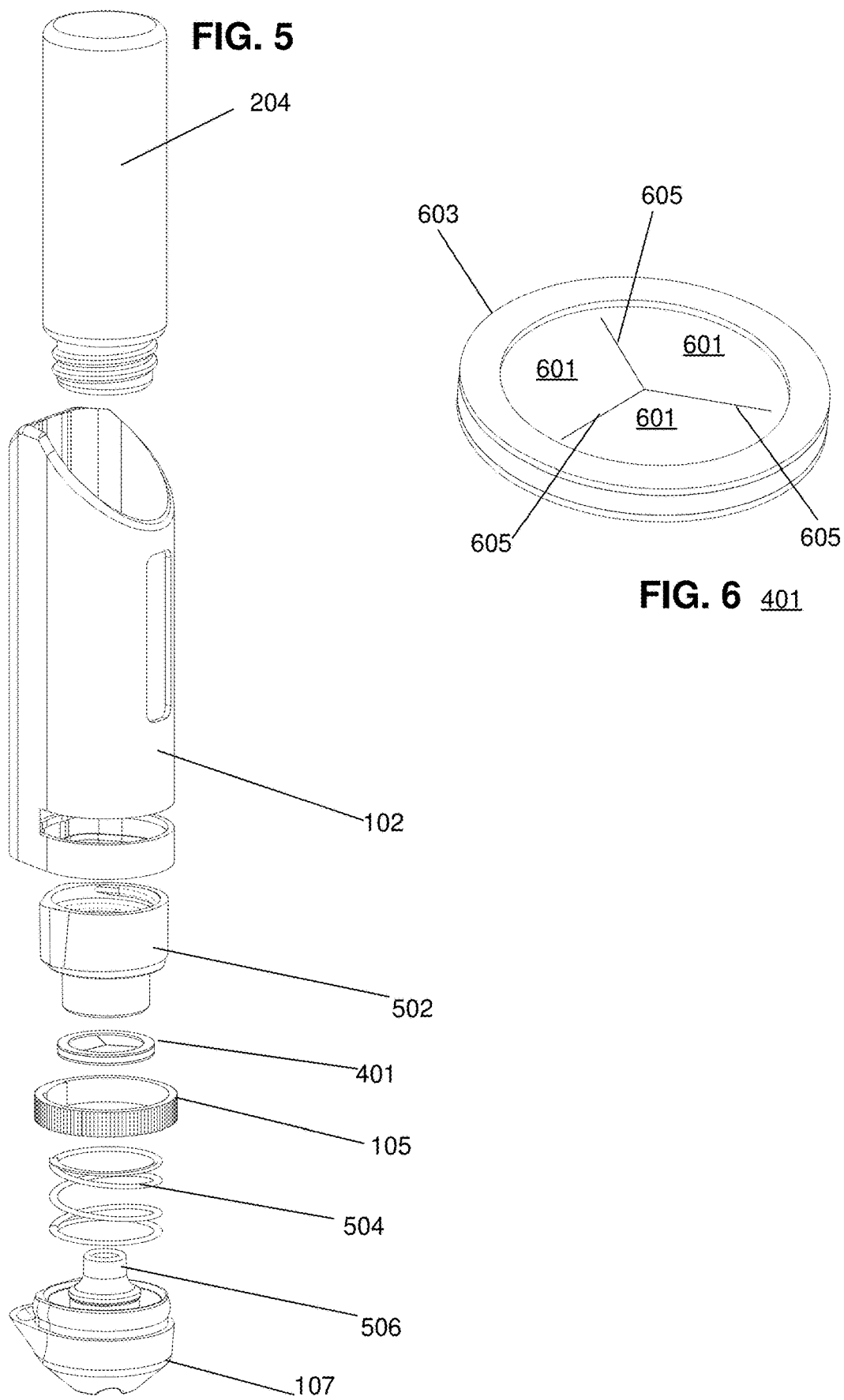

POWDER DISPENSER

CROSS REFERENCE TO RELATED APPLICATIONS

The present application claims priority from U.S. Provisional Patent Application No. 63,272,188, filed on Oct. 27, 2021, under 35 U.S.C. 119(e). The contents of the above mentioned provisional patent application are incorporated herein by reference for all purposes to the extent that such subject matter is not inconsistent herewith.

FIELD OF THE INVENTION

Embodiments of the present invention generally relate to the field of dispensers. More particularly, embodiments of the invention relate to facilitating the storage, easy dispensing and consumption of powdered substances in the kitchen, home, and recreational use.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The need to accurately and easily dispense powders is a common one in the modern world. Small accurately measured servings of powdered salt, sugar and spices are often needed in cooking or when on the go. The most basic way of dispensing such portions is by using shakers and other containers with perforated/mechanically limiting openings.

When positioned with the opening pointed generally down, such containers allow the powdered contents to gradually dispense using gravity. Although common, this most basic approach primarily suffers from the flaw of imprecise metering of the dispensed amount—oftentimes accidentally dispensing too much of powder or instead taking too long to dispense the needed amount.

Manual grinders which force the powder through a permeable-when-mechanically-actuated rotary seal—dispense powders very accurately and evenly, but require the use of two hands and tend to be large in size and relatively mechanically complex. A related approach which allows one-handed operation is the push-button 'salt cannon' type of a powder dispenser—which employs a permeable seal created by the linear translation of a rough-surfaced rod through a metering opening. Entrained by the rough surface features of this rod, precise amounts of powder are pushed out from the storage container and dispensed. However, this method is also relatively mechanically complex, needs multiple hard metal parts, features an intrusive 'stick' that pokes out during operation and most importantly does not assure a secure seal on the powder held in the container when it is at rest.

Another practice that has been gaining popularity recently involves snorting small servings of Cacao or chocolate powder to increase the speed of caffeine's onset. This procedure normally involves a somewhat complicated process: reaching into a storage container, retrieving a portion with a spoon or another similar device, partitioning a serving on a flat surface and then using a straw or a miniature spoon to ingest it.

SUMMARY OF THE DESCRIPTION

Embodiments of the present invention are best understood by reference to the detailed figures and description set forth herein. Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive. It is to be further understood that the present invention is not limited to the particular methodology, compounds, materials, manufacturing techniques, uses, and applications, described herein, as these may vary.

It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. It is to be further understood that the present invention is not limited to the particular methodology in the art. Similarly, for another example, a reference to "a step" or "a means" is a reference to one or more steps or means and may include sub steps and subservient means.

All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

The invention described herein relates to a simple and rugged metering dispenser of powdered substances which combines the secure storage of powders with their one-hand-actuated dispensing and the integrated ability for user to directly insufflate the dispensed powder.

BRIEF DESCRIPTION OF THE DRAWINGS

The present invention is illustrated by way of example and not limitation in the figures of the accompanying drawings in which like references indicate similar elements.

FIG. 5 illustrates an exploded view a powder dispenser, in accordance with an embodiment of the present invention.

FIG. 6 illustrates a perspective view of a permeable slit flexible membrane, in accordance with an embodiment of the present invention.

DETAILED DESCRIPTION

Figures 1A, 1B:
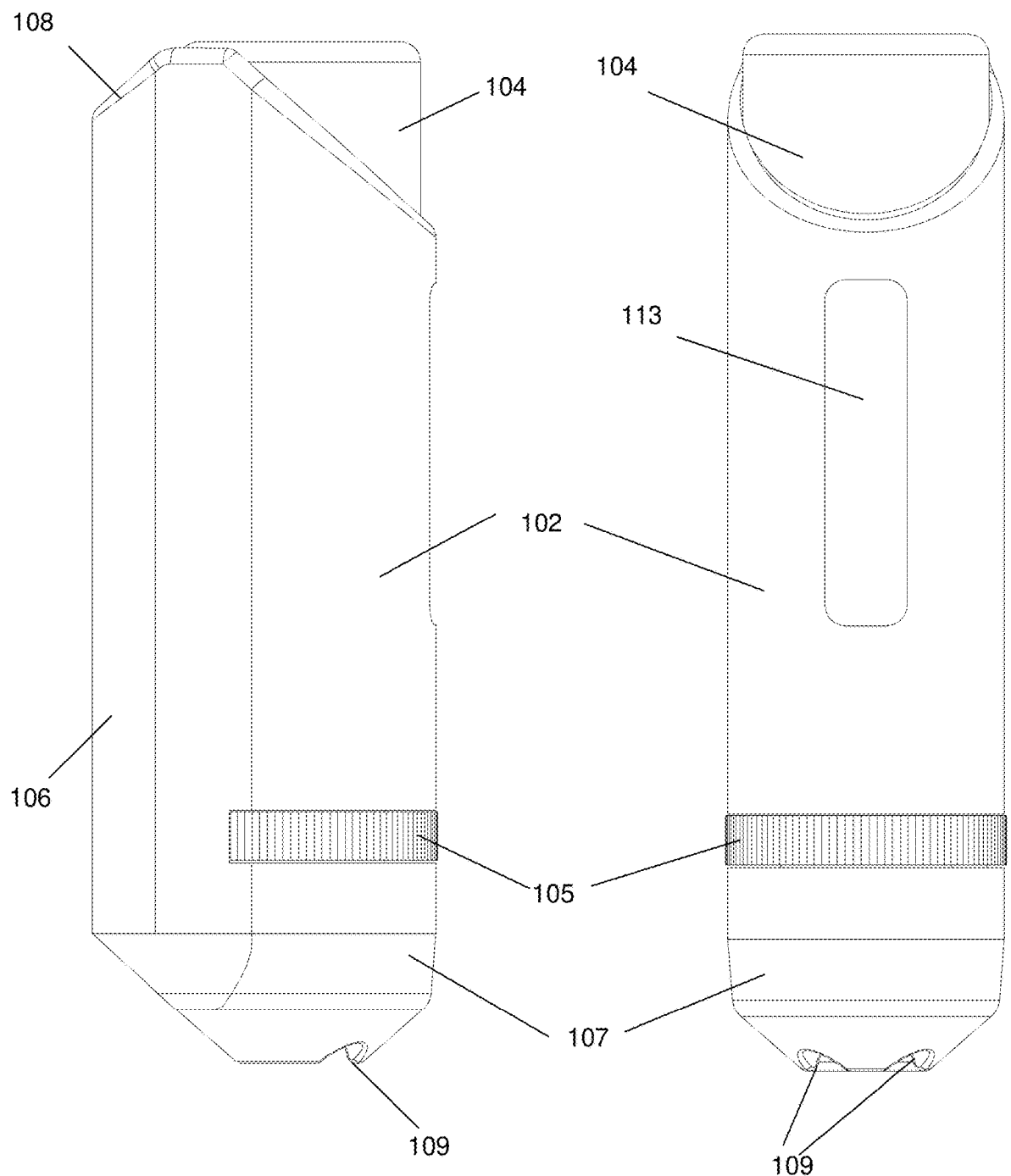
FIG. 1A illustrates a first side view of a powder dispenser, in accordance with an embodiment of the present invention.
FIG. 1B illustrates a second side view of a powder dispenser, in accordance with an embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Structures described herein are to be understood also to refer to functional equivalents of such structures. The present invention will now be described in detail with reference to embodiments thereof as illustrated in the accompanying drawings. From reading the present disclosure, other variations and modifications will be apparent to persons skilled in the art. Such variations and modifications may involve equivalent and other features which are already known in the art, and which may be used instead of or in addition to features already described herein. Although Claims may have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although it may.

As is well known to those skilled in the art many careful considerations and compromises typically must be made when designing for the optimal manufacture of a commercial implementation any system, and in particular, the embodiments of the present invention.

A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those skilled in the art will readily recognize, in light of and in accordance with the teachings of the present invention, that any of the foregoing steps may be suitably replaced; reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

The present invention will now be described in detail with reference to embodiments thereof as illustrated in the accompanying drawings.

FIGS. 1A and 1B illustrate a first and second side view of a powder dispenser, respectively, in accordance with an embodiment of the present invention. As illustrated in FIG. 1A, the powder dispenser is configured to comprise a housing 102. Housing 102 accommodates reservoir 104. The powder dispenser is configured to provide an interface with reservoir 104 and selectively restricting/re-directing the deposition of powder from reservoir 104. This affords the user novel and convenient functionality of a powder dispenser (also referred to herein as a device). Powder dispenser can also include one or more observation slot(s) 113 to view/observe the amount of powder in reservoir 104.

To selectively restrict or redirect the deposition of the powder from reservoir 104, the powder dispenser employs a selectively permeable slit flexible membrane, as set forth further herein. A movable spring-biased dispensing orifice 107 is provided that can move within housing 102 to allow for dispensing of the powder from reservoir 104. In another embodiment, the powder dispenser includes inhalation channel 106 that mates with the dispensing area of spring-biased dispensing orifice 107.

In another embodiment, the powder dispenser can include an optional travel adjustment ring 105. In yet another embodiment, powder dispenser includes one or more air-vent(s) 109 that assist in inhalation of the powder from orifice 108 using inhalation channel 106, when spring-biased dispensing orifice 107 is blocked, as further described herein.

As illustrated in FIG. 1B, slot cut 113 on housing 102 can be configured to expose a side of reservoir 104 and enables easy tracking of the amount of powder material remaining in reservoir 104. In a preferred embodiment, reservoir 104 is ideally transparent.

Figures 2A, 2B:
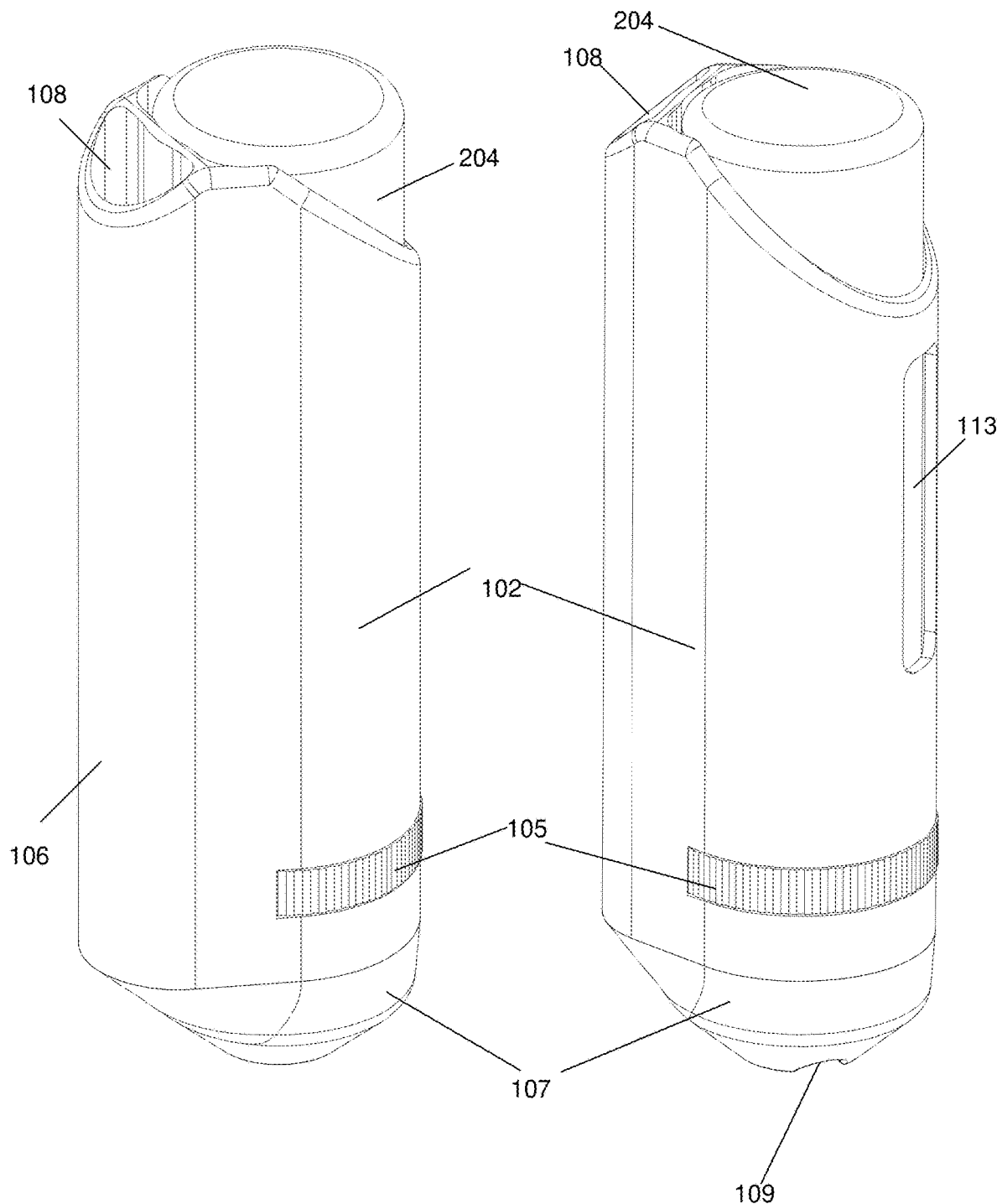
FIG. 2A illustrates a first perspective view of a powder dispenser, in accordance with an embodiment of the present invention.
FIG. 2B illustrates a second perspective view of a powder dispenser, according to an embodiment of the invention described herein.

FIGS. 2A and 2B illustrate a first and second perspective view of a powder dispenser, respectively, in accordance with another embodiment of the present invention. As illustrated, the powder dispenser reservoir 204 in this embodiment is cylindrical in shape. Without limitation, housing 102 can be configured to accommodate a variety of conventional or unconventional bottle storage containers to act as reservoir 204. Without limitation, this includes round or square shaped storage containers, 1-dram glass vials, etc. Reservoir 204 can also, in one embodiment, comprise a screw top, which can be screw-threaded (not shown) inside housing 102 as described further herein.

Figures 3, 4:
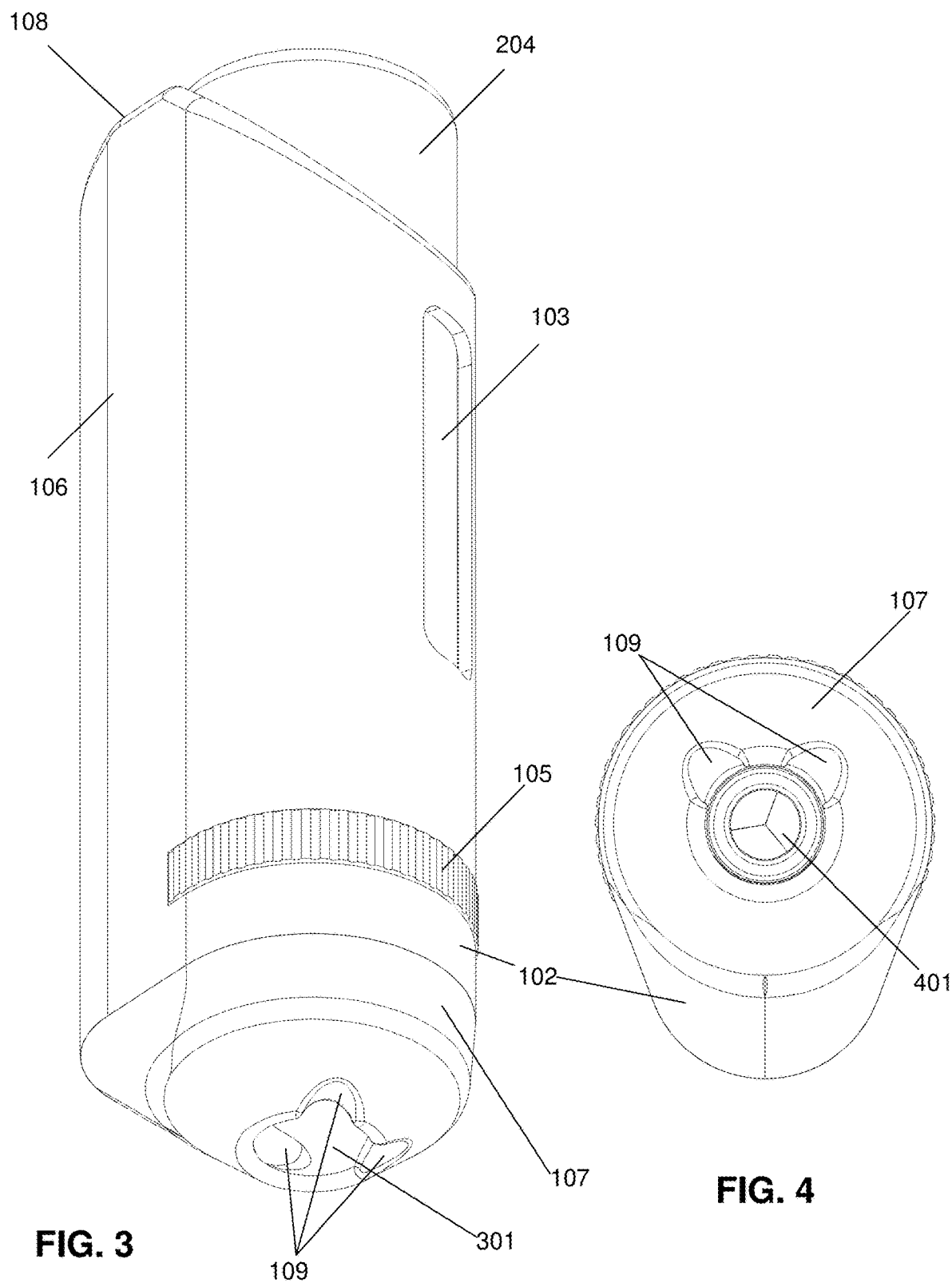
FIG. 3 illustrates a perspective view of a powder dispenser depicting a side view and bottom view of the powder dispenser, in accordance with an embodiment of the present invention.
FIG. 4 illustrates a perspective bottom view of the powder dispenser in a non-actuated storage configuration, in accordance with an embodiment of the present invention.

FIG. 3 illustrates a perspective view of a powder dispenser depicting a bottom side of the powder dispenser, in accordance with an embodiment of the present invention. In one embodiment, spring-biased dispensing orifice 107 comprises a dispensing area 301 that allows deposition of the powder from reservoir 104/204.

As set forth, in one embodiment, powder dispenser can include one or more air-vent(s) 109 that can be configured to assist in dispensing the powder from orifice 108, using inhalation channel 106. In this embodiment, inhalation channel 106 is configured to be operable when the dispensing area 301 of movable spring-biased dispensing area 107 is blocked (e.g., using a finger, etc.), when the powder dispenser is being operated. One or more air vent(s) 109 can be configured to provide an air-flow path which assists the user in inhaling the powder from orifice 108. This airflow path allows for dispersion of powder particles and facilitates easy insufflation of the dispensed powder. Inhalation channel 106 adds another novel inventive component to the powder dispenser since it is configured to provide additional functionality of a built-in 'straw' inhalation channel feature integrated into the device's side.

FIG. 4 illustrates a perspective bottom view of the powder dispenser in a non-actuated storage (resting) configuration, in accordance with an embodiment of the present invention. In one embodiment, a user actuates movement of a moving assembly. In one embodiment, the moving assembly comprises of a movable spring-biased dispensing orifice 107 that is configured to move within housing 102, thereby resulting in penetration of a portion of spring-biased dispensing orifice 107 into selectively permeable slit flexible membrane 401. In another embodiment, the moving assembly comprises a movable base (as further illustrated in FIG. 5), which causes a movement of reservoir 104/204. In this embodiment, spring-biased dispensing orifice is stationary, as further described herein. The movement of the moving assembly provides access to the powder substance presented in reservoir 104/204. As illustrated in FIG. 4, slit membrane 401 is not penetrated, thus signifying that powder dispenser in not being operated in this view. In one embodiment, the penetration of a portion of spring-biased dispensing orifice 107 into flexible membrane 104 causes a spring (as further illustrated in FIG. 5) to compress during device's operation by the user exerting a force on the moving assembly. In one embodiment, this force is provided using an electronic actuator. In one embodiment, the electronic actuator can be configured to perform any functionality of a spring described herein. In yet another embodiment, the electronic actuator (e.g., servomotor) can be coupled to a digital processing device.

In embodiments that employ a spring, when the force is released, the spring rebounds which causes the moving assembly to return to its original (resting) position, thus allowing membrane 401 to be unpenetrated to securely close the slit.

FIG. 5 illustrates an exploded view a powder dispenser, in accordance with an embodiment of the present invention. As illustrated, in one embodiment, powder dispenser can be configured to include reservoir 204 that is further configured to be surrounded by housing 102 at a first lateral end. Base 502 can be configured to couple within housing 102 from a second lateral end. Base 502 can be configured to connect/mate with reservoir 204. In one embodiment, base 502 can comprise screw-threads to mate with reservoir 204 having complementary threads (e.g., screw top bottle) at its opening. Base 502 can be configured to mate with selectively permeable slit membrane 401, such that when reservoir 204 mates with base 502, the opening of reservoir 204 mates with selectively permeable slit membrane 401. A person having ordinary skill in the art would appreciate that the diameter or dimensions of membrane 401 is expected to be smaller than that of base 502. As described above, in one embodiment, the moving assembly can comprise a movable spring-biased dispensing orifice 107, relative to housing 102, with a stationary reservoir 104/204.

In another embodiment spring-biased dispensing orifice 107 is configured to be stationary relative to housing 102. In this embodiment, the moving assembly comprises reservoir 104/204, base 502, and membrane 401. When a force is applied (e.g., by a user), the moving assembly moves downward into interaction with the leading edge 506 of the stationary spring-biased dispensing orifice 107, compressing spring 504, thereby causing the penetration of membrane 401 and dispersion of the powder. In this embodiment, membrane 401 translates inside base 502. When the force is released, spring 504 rebounds causing the moving assembly to move back into its non-actuating (resting) configuration.

In another embodiment, assembly of the reservoir 104/204 is installed in base 502 integrating membrane 401, and is biased away from orifice 107 by spring 504. Spring 504 maintains tight closure of membrane 401, unless said assembly is translated towards orifice 107 by an applied force (e.g., user's finger).

In one embodiment, the powder dispenser can also include travel adjustment ring 105. Travel adjustment ring 105 can be configured to mate with base 502. Travel adjustment ring 105 can be configured to adjust the maximum travel depth/translation of the moving assembly. In one embodiment, a rotation of travel adjustment ring 105 can be configured to limit the maximum translating distance of the moving assembly. In another embodiment, travel adjustment ring 105 is configured as a dial which moves the interference point of a tab (not shown) along a coincident contact with a circularly-arranged ramp on the bottom body of base 502. This arrangement allows the user to adjust the maximum travel limit of the moving assembly. Such maximum travel variance allows for the user to control the degree of opening that membrane 401 undergoes at the maximum extent of travel, making the device more comfortable to use in daily life. In one embodiment, travel adjustment ring 105 can be configured to control of depth of penetration by leading edge 506 of spring-biased dispensing orifice 107 into membrane 401 thereby affecting how much the slit in membrane 401 will open.

In one embodiment, base 502 includes interference/snap-fit features (not shown) that can limit the linear travel extents of spring-biased dispensing orifice 107. In this embodiment, base 502 can be configured to adjust the actuating travel depth by twisting a screw-threaded 'hard stop' as limited by interference with 105. A rotation of spring-biased dispensing orifice 107 relative to base 502 (or of base 502 to orifice 107) can be configured to align potentially interfering geometry on leading edge 506 of spring-biased dispensing orifice 107 to achieve 'locked' or 'unlocked' configurations of the device. This locking adjustment can allow the moving assembly to either slide freely when pressed with fingers or to block its travel path and ensure the membrane 401 stays closed.

In one embodiment, the device includes spring 504 which provides rebound movement to the moving assembly. Spring 504 can be configured to reside between spring-biased dispensing orifice 107 and base 502.

A person having ordinary skill in the art would appreciate that alternative configurations can be achieved and that the assembly configuration illustrated in FIG. 5 is one of many possible alternative embodiments that can be created using the teachings described herein.

FIG. 6 illustrates a perspective view of a permeable slit flexible membrane 401, in accordance with an embodiment of the present invention. In one embodiment, membrane 401 comprises stiff reinforcement ring 603 having a flexible membrane 601 that selectively permits passage of the powder in the device through one or more tightly-cut shut-when-relaxed slit(s) 605. One or multiple stiff reinforcement rings are configured to be integrated into membrane 401 to allow for membrane 401 to both be better constrained in place during installation and to not get 'deformed out of place' during repeated penetration of slit 605 by the leading edge 506 of spring-biased dispensing orifice 107.

Membrane 401 can be configured to act as secure barrier, when slit 605 is closed preventing the powder from escaping from the container. Slit 605 remains closed when the device is in a non-actuated 'storage' configuration. When the powder dispenser is in use, by actuating movement of the moving assembly, leading edge 506 penetrates membrane 401 through slits 605, thereby providing dispensing area 301 direct access to the powder in the device. If a user has blocked outside path of powder exit from dispensing area 301 (e.g., using a finger) the powder can then be directed to orifice 108 through intake orifice 701 and inhalation channel 106 as described above. In a preferred embodiment, a three-petaled arrangement of slits 605 as illustrated is provided. This is determined to be advantageous for reasons of not catching on the leading edge 506 of the spring-biased dispensing orifice 107 during the operation of the product.

In one embodiment, membrane 401 is constructed using silicone, a silicone based polymer, or any other easily deformable yet resilient material (e.g., a thin membrane made from thin sheet spring-steel, or a series thereof, etc.). The size and geometry of slit 605 can be modified directly. Specifically, a person having ordinary skill in the art would appreciate that slit(s) 605 could be configured to have various patterns or variations from the one illustrated in FIG. 6. The material properties of harness and flexibility can also be modified, as appreciated by one having ordinary skill in the art.

Figures 7A, 7B:
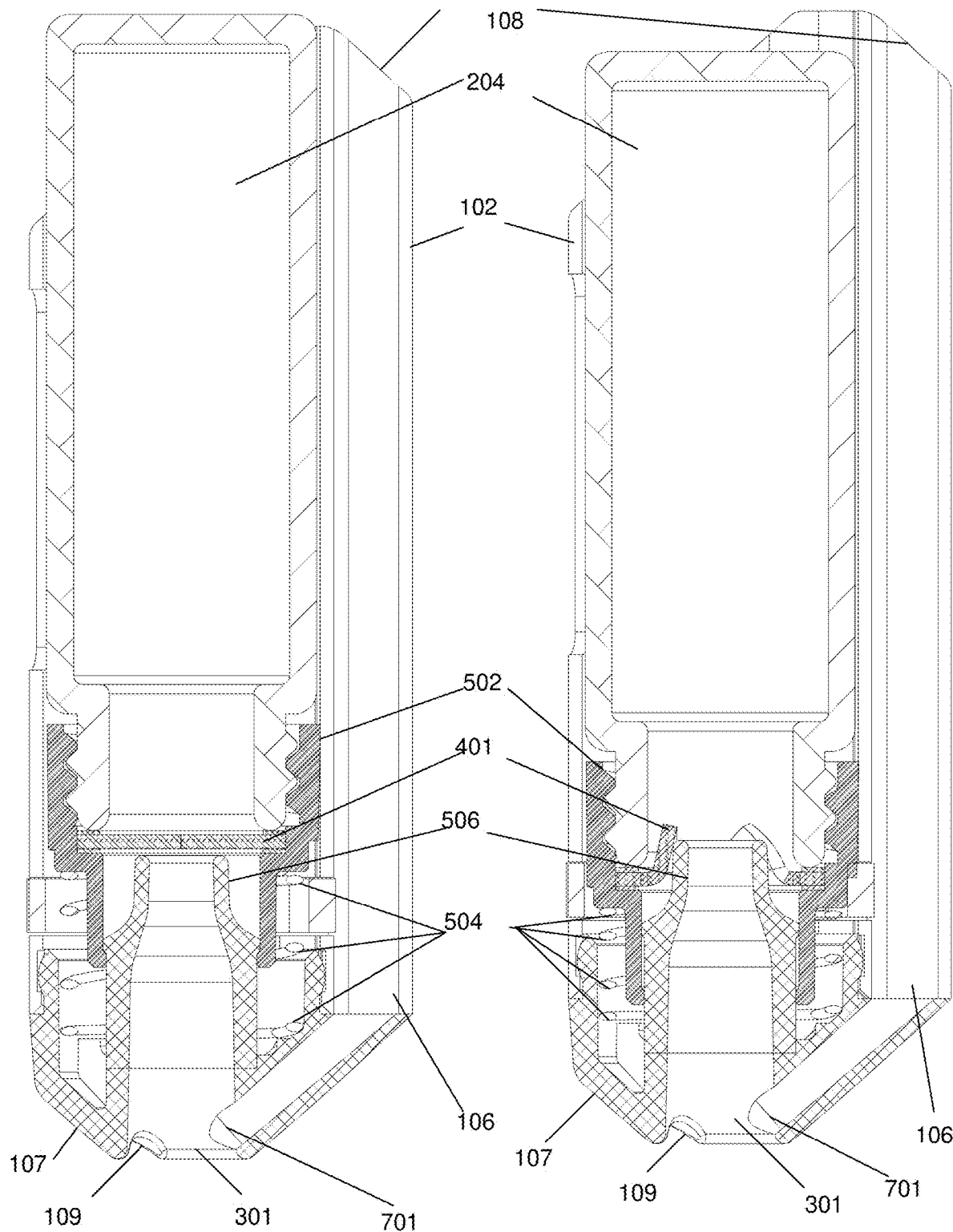
FIG. 7A illustrates a cross-sectional view of a powder dispenser, in a non-actuated storage configuration, in accordance with an embodiment of the present invention.
FIG. 7B illustrates a cross-sectional view of a powder dispenser, in an actuated dispensing configuration, in accordance with an embodiment of the present invention.

FIGS. 7A and 7B, respectively, illustrate a cross-sectional view of a powder dispenser, in a non-actuated 'storage' configuration and actuating 'dispensing' configuration, in accordance with an embodiment of the present invention. As illustrated in FIG. 7A, in the storage configuration spring 504 is not actuated and is in its resting state. Leading edge 506 does not penetrate membrane 401, and this 'closed configuration' thus prevents powder from being dispensed by the device. When the device is actuated as illustrated in FIG. 7B, leading edge 506 penetrates through membrane 401 and permits the device to dispense powder into dispensing area 301 of spring-biased dispensing orifice 107.

When dispensing area 301 is closed-up by some external surface (a palm, finger, a supplementary cap or an integrated strip, etc.) and the device is actuated (FIG. 7B) to deposit a dose of powder onto that surface, the intake orifice 701 of the inhalation channel 106 can be employed to dispense the contents through orifice 108. While maintaining the barrier at dispensing area 301, the user can mate their nostril at orifice 108 and inhale the dispensed powder through inhalation channel 106. The direct integration of this inhalation channel adds dramatically novel summary functionality and convenience to the device, while combining the storage of a powder, the easy distribution of a small portion of it and the ability for the user to directly insufflate that powder.

Thus, a powder dispenser that arranges a membrane and a dispensing orifice in a novel manner is presented, that uses compression spring(s) located around the powder flow path is described. However, a number of adjustments can be employed to vary the size of the opening created in membrane 401 to ensure the desired flow for different powder consistencies. In yet another embodiment, an alternative spring arrangement can be employed (e.g., dual compression springs, leaf springs integrated into the body, etc.). Such arrangements are envisioned as being possible and may be beneficial for some alternative device configurations.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing the invention described herein will be apparent to those skilled in the art. Various aspects of the invention have been described above by way of illustration, and the specific embodiments disclosed are not intended to limit the invention to the particular forms disclosed.

The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A powder dispenser, comprising:
    a reservoir configured for storing a powder to be dispensed;
    a permeable slit flexible membrane configured for selectively permitting dispensing of the powder, wherein the permeable slit flexible membrane mates with the reservoir and acts as a secure barrier to prevent the powder from escaping from the reservoir when the powder dispenser is not in operation;
    a spring-biased dispensing orifice, including a dispensing area configured for dispensing the powder;
    a moving assembly configured to cause penetration of a portion of the spring-biased dispensing orifice into the permeable slit flexible membrane when a force is applied on the moving assembly; and
    a spring, coupled to the moving assembly, configured to rebound the moving assembly into a resting position when the force is released.

2. The powder dispenser of claim 1, further comprising an inhalation channel configured to be operable for inhaling the powder to be dispensed, wherein the inhalation channel becomes operable for inhaling the powder when the dispensing area is blocked by a user.

3. The powder dispenser of claim 2, wherein the inhalation channel further comprises an intake orifice and a tubing segment.

4. The powder dispenser of claim 2, further comprising an air inlet configured for creating an airflow path when the dispensing area is blocked by the user.

5. The powder dispenser of claim 1, wherein the moving assembly includes at least one of the reservoir, a base coupled to the reservoir, or the permeable slit flexible membrane.

6. The powder dispenser of claim 1, wherein the moving assembly includes the spring-biased dispensing orifice.

7. The powder dispenser of claim 1, further comprising an observation slot configured for observing an amount of powder remaining in the reservoir.

8. The powder dispenser of claim 1, further comprising a travel adjustment ring, the travel adjustment ring controlling a maximum translation of the moving assembly.

9. The powder dispenser of claim 1, wherein the portion of the spring-biased dispensing orifice that penetrates the permeable slit flexible membrane includes a leading edge.

10. The powder dispenser of claim 1, wherein the permeable slit flexible membrane is constructed using at least one of silicone or another easily deformable yet resilient material.

11. A powder dispenser, comprising:
    a means configured for storing a powder to be dispensed;
    a means configured for selectively permitting the dispensing of the powder, wherein the means configured for selectively permitting the dispensing of the powder mates with the means configured for storing and acts as a secure barrier to prevent the powder from escaping from the means configured for storing when the powder dispenser is not in operation;
    a means configured for dispensing of the powder, wherein the means configured for dispensing includes a dispensing area configured for dispensing the powder;
    a means configured for penetrating the means configured for selectively permitting the dispensing of the powder, wherein the means configured for penetrating causes a portion of the means configured for dispensing into the means configured for selectively permitting the dispensing of the powder when a force is applied on the means configured for penetrating; and
    a means configured for rebounding the means configured for penetrating into a resting position when the force is released.

12. The powder dispenser of claim 11, further comprising a means configured for inhaling the powder, the means for inhaling comprises an inhalation channel that becomes operable for inhaling the powder when the dispensing area is blocked by a user.

13. The powder dispenser of claim 12, wherein the means configured for inhaling further comprises an intake orifice and a tubing segment.

14. The powder dispenser of claim 12, further comprising a means configured for providing an air-flow path when the dispensing area is blocked by the user.

15. The powder dispenser of claim 11, wherein the means configured for penetrating includes at least one of the means configured for storing, a base coupled to the means configured for storing, or the means configured for selectively permitting the dispensing of the powder.

16. The powder dispenser of claim 11, wherein the means configured for penetrating includes the means configured for dispensing.

17. The powder dispenser of claim 11, further comprising a means configured for observing an amount of powder remaining in the means configured for storing.

18. The powder dispenser of claim 11, further comprising a means configured for adjusting a maximum translation of the means configured for penetrating.

19. The powder dispenser of claim 11, wherein the portion of the means configured for dispensing that penetrates the means configured for selectively permitting the dispensing of the powder includes a leading edge.

20. The powder dispenser of claim 11, wherein the means configured for selectively permitting the dispensing of the powder is constructed using at least one of silicone or another easily deformable yet resilient material.

* * * * *